United States Patent
Harland et al.

(10) Patent No.: US 10,938,782 B1
(45) Date of Patent: Mar. 2, 2021

(54) SECURE HARDWARE SIGNAL FILTERING

(71) Applicant: Amazon Technologies, Inc., Reno, NV (US)

(72) Inventors: Jason Alexander Harland, Seattle, WA (US); Michael Joseph Kentley, Bend, OR (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 15/391,464

(22) Filed: Dec. 27, 2016

(51) Int. Cl.
*H04L 29/06* (2006.01)

(52) U.S. Cl.
CPC ...... *H04L 63/0236* (2013.01); *H04L 63/0209* (2013.01)

(58) Field of Classification Search
CPC ............. G06F 21/6218; G06F 12/1416; G06F 12/145; G06F 11/1451; H04L 63/102
See application file for complete search history.

(56) References Cited

U.S. PATENT DOCUMENTS

| | | | | |
|---|---|---|---|---|
| 7,934,249 B2 * | 4/2011 | Chan | ............ | G06F 21/6218 726/1 |
| 2006/0200641 A1 * | 9/2006 | Insley | ............ | H04L 1/1607 711/163 |
| 2009/0205018 A1 * | 8/2009 | Ferraiolo | ............ | G06F 21/6218 726/1 |
| 2012/0144210 A1 * | 6/2012 | Yacobi | ............ | H04L 9/0836 713/193 |
| 2013/0132690 A1 * | 5/2013 | Epstein | ............ | G06F 12/1416 711/159 |
| 2016/0350248 A1 * | 12/2016 | Dionisio | ............ | G06F 13/404 |
| 2016/0364305 A1 * | 12/2016 | Pitigoi-Aron | ............ | G06F 13/4282 |
| 2017/0099228 A1 * | 4/2017 | Hunsperger | ............ | G06F 9/545 |

* cited by examiner

*Primary Examiner* — Harunur Rashid
(74) *Attorney, Agent, or Firm* — Hogan Lovells US LLP

(57) ABSTRACT

Systems and methods in accordance with various embodiments of the present disclosure provide secure filtering of transactions at a hardware and protocol level using a security device included on a server. In particular, various embodiments provide approaches for filtering transactions on various buses, such as SMBus, PMBus, I2C, and SPI, within a server. This filtering logic can be utilized to modify requests for access to devices on those busses, certain memory or registers within the devices, and/or limit the quantity of transactions on those busses. Embodiments may provide a policy engine through which the filtering logic applied to a given bus or buses may be modified. When a transaction is received, one or more attributes of the transaction can be compared to one or more policies. If there is a match, the transaction can be modified according to the matched policy.

19 Claims, 9 Drawing Sheets

US 10,938,782 B1

SECURE HARDWARE SIGNAL FILTERING

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed. As more services have been made available online through such systems, more data and types of data are being exchanged between systems. This may expose systems to potentially harmful activity.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches by providing secure filtering of transactions at a hardware and protocol level. In particular, various embodiments provide approaches for filtering transactions on various buses, such as SMBus, PMBus, I2C, and SPI, within a server or other computer. This filtering logic can be utilized to block read and write access to devices on those busses, certain memory or registers within the devices, and/or limit the quantity of transactions on those busses. Embodiments may provide a policy engine through which the filtering logic applied to a given bus or buses may be modified. When a transaction is received, one or more attributes of the transaction can be compared to one or more policies. If there is a match, the transaction can be modified.

Various other applications, processes, and uses are presented below with respect to the various embodiments.

Figure 1A:
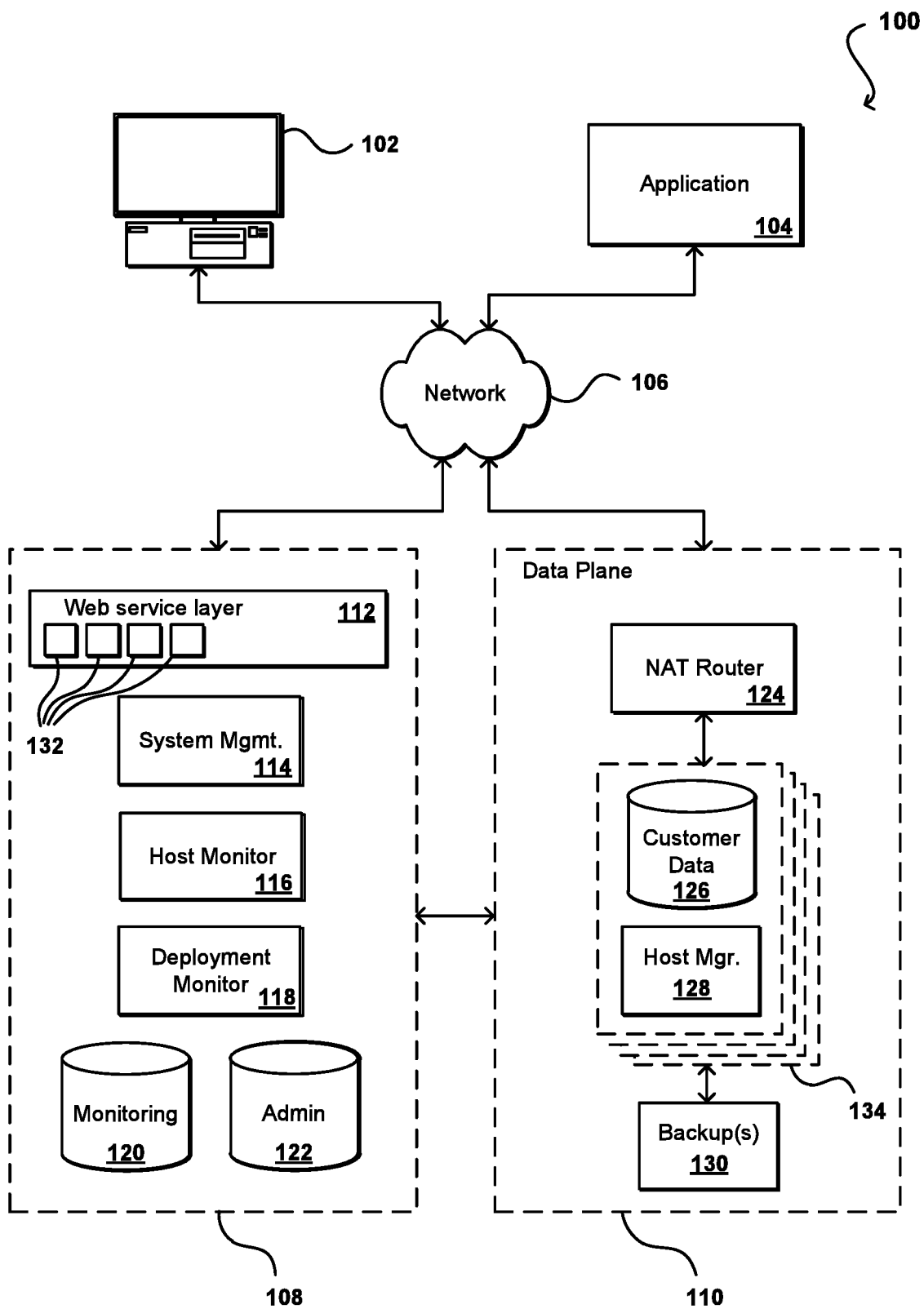
FIGS. 1A and 1B illustrate an example environment in which various embodiments can be implemented.

FIG. 1A illustrates an example operating environment associated with a service provider in accordance with various environments, which an emphasis on describing an example control plane. As described, functionality at least a portion of a user's operating environment can be migrated to the operating environment associated with a service provider, such as service provider environment 100 in FIG. 1A. The environment can be a multi-tenant environment, for example, wherein multiple customers are able to share the resources of the environment. This can include customers having dedicated resources, having dedicated portions of shared resources (i.e., shared storage on one or more data stores or data servers), or sharing available capacity on various resources, among other such options. Accordingly, the user can be provided access to resources appropriate to operate the user's enterprise computing needs. This can include, for example, enabling access to resources that provide functionality corresponding to all or a portion of the user's operating environment. For example, in the situation where a user's operating environment includes a health care environment that includes a web front-end, the user can extend at least the web front-end into an environment associated with a service provider, where the service provider provides the resources (e.g., hardware and software) for the user to manage the web front-end. In this example, the resources provided by the service provider can be used to perform tasks such as authenticating users of the health care environment based on credentials, authorizing the users of the health care environment, throttling requests to servers of the health care environment, validating inputs, and marshalling or unmarshalling requests and responses. It should be noted that although this example is directed towards the functionality associated with a web front-end, the user can migrate and manage functionality of other resources of the user's health care environment in the service provider's environment.

For example, a computing device 102 for an end user or customer can make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

As described, leveraging a service provider's environment can advantageously provide a customer with increased reliability and fault tolerance. For example, the control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance or virtual machine) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. In various embodiments the resource instances may receive and send network traffic using one or more NAT routers 124 or other networking devices. In some embodiments, backups 130 of all or portions of the resource instances 134 may also be maintained and managed. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

Figure 1B:
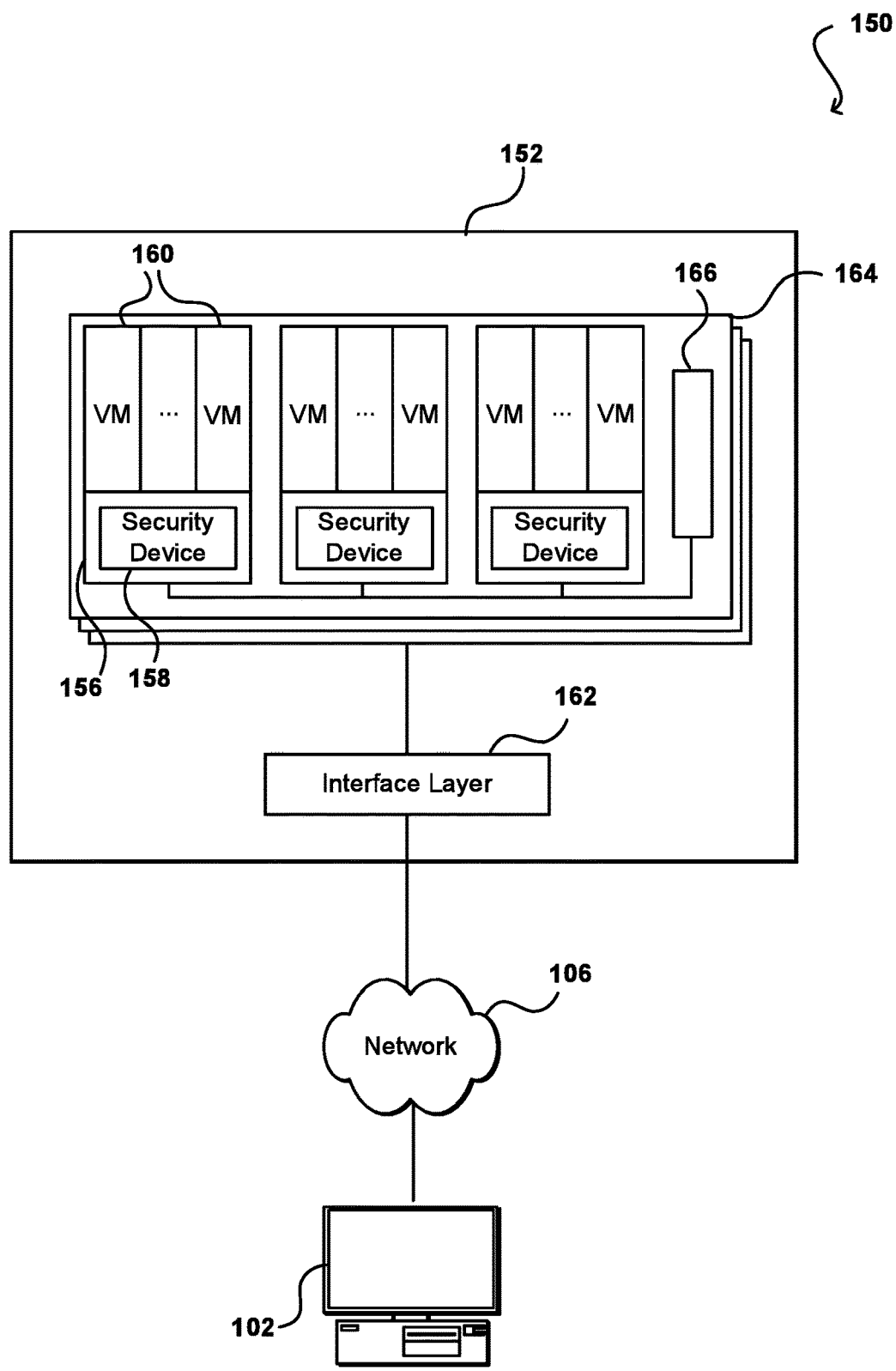

FIG. 1B illustrates a second view 150 of the example environment 100 in which aspects of the various embodiments can be implemented. In this example, a user is able to utilize the computing device 102 to submit a call or request to a shared resource environment 152. The resource environment 152 in this example includes an interface layer 162, as may include components such as application programming interfaces (APIs), routers, switches, servers, and other such components known or used for routing communications from a user computing device 102 to an appropriate resource in the environment. In this example, the resource environment 152 includes a number of racks 164, each rack including a number of host computing devices 156, as well as an optional rack support computing system 166 in this example embodiment. The host computing systems 156 on one of the illustrated racks 164 each host one or more virtual machines 160 in this example. In some embodiments, each host computing system 156 may include a security device 158. Security device 158 may be implemented as an application-specific integrated circuit, programmable logic device, or other device that is configured to provide secure filtering of transaction requests as they are received from, e.g., users, other computing devices, applications, or other entities. As shown, each computing device 156 may include a security device. In some embodiments, each rack may include a security device providing secure filtering for each computing device included therein. A virtual machine manager (VMM) is tasked with managing the virtual machines (VMs) on the respective host device, and handling various aspects of virtualization. Each virtual machine 160 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 152. Each computing system may also have one or more local attached storage devices (not shown), such as to store local copies of programs and/or data created by or otherwise used by the executing programs, as well as various other components.

It will be appreciated that the examples of FIGS. 1A and 1B have been simplified for the purposes of explanation, and that the number and organization of host computing systems and other devices may be much larger than what is depicted. For example, as one illustrative embodiment, there may be approximately tens of thousands of computing systems in a cloud environment, with at least some of those computing systems being host computing systems that may each host multiple virtual machines.

Figure 2:
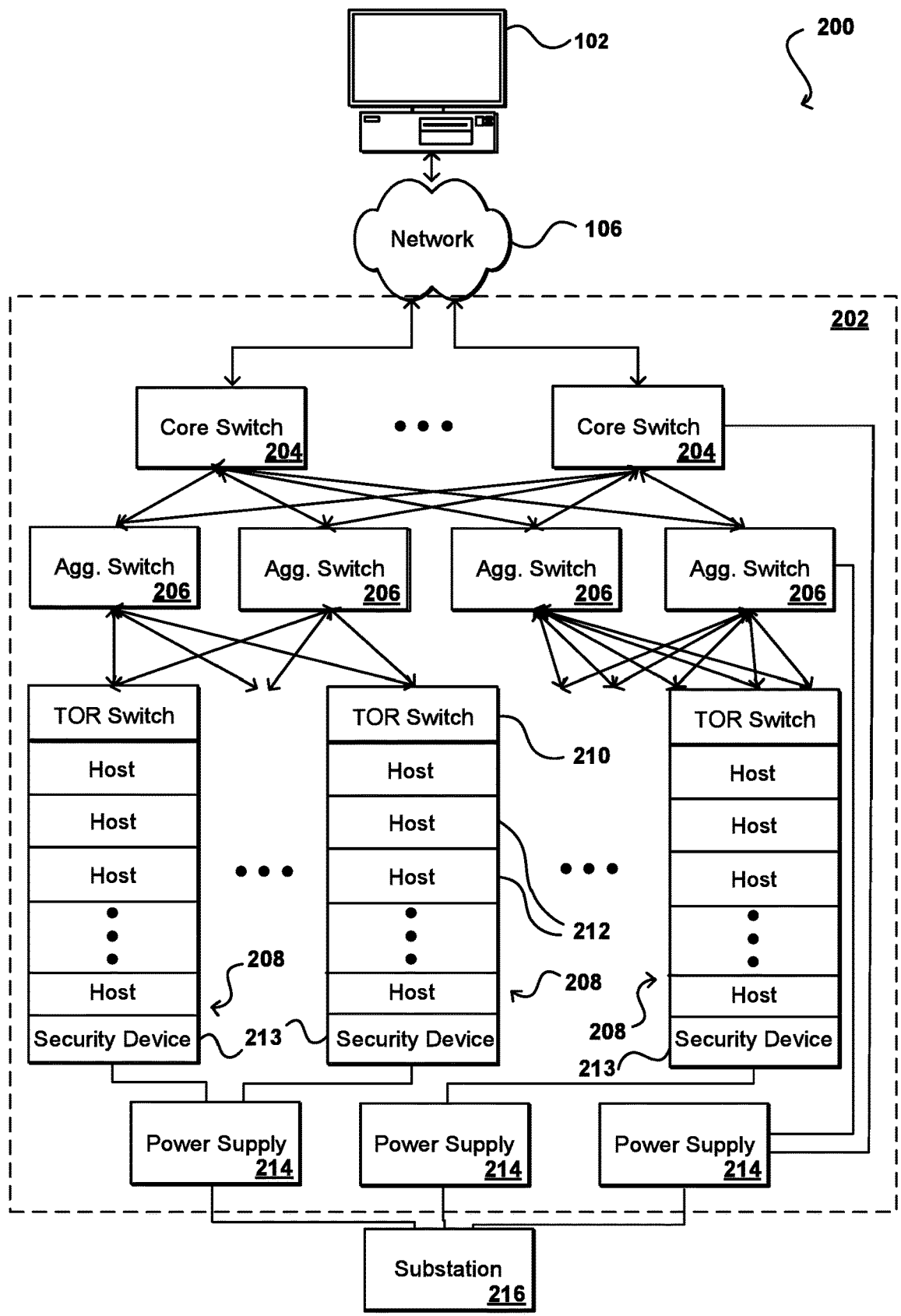
FIG. 2 illustrates an example configuration of resources in a resource zone or environment that can be utilized in accordance with various embodiments.

FIG. 2 illustrates an example configuration 200 that represents a traditional hierarchical network design that can be used to route requests to specific host machines or other such devices in such an environment, in order to provide users or applications with access to a variety of distributed resources. This example shows a typical design that can be used for a data center, wherein a source such as an end user device 102 is able to send requests across at least network 106, such as the Internet, to be received by one or more components of the data center. It should be noted that reference numbers for similar components are carried over between figures for simplicity of explanation, but such usage should not be interpreted as a limitation on the scope of the various embodiments unless otherwise explicitly stated. Properties of various components of the network, such as provisioned instances, etc., can be managed using at least one management system, component, or service. In this example, the requests are received over the network to one of a plurality of core switches 204 of a data center zone 202, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 204 is able to communicate with each of a plurality of aggregation switches 206, which in at least some embodiments are utilized in pairs. Utilizing aggregation switches in pairs provides a redundant capability in case one of the switches experiences a failure or is otherwise unavailable, such that the other device can route traffic for the connected devices. Each pair of aggregation switches is linked to a plurality of physical racks 208, each of which typically contains a top of rack (TOR) or "access" switch 210 and a plurality of physical host machines 212, such as data servers, application servers, and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred-twenty racks, based on factors such as capacity and number of ports. There can be any appropriate number of aggregation switches in a data center, such as six aggregation pairs. The traffic from the aggregation pairs can be aggregated by the core switches, which can pass the traffic "up and out" of the data center, such as back across the at least one network 106. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" rack (a sub-rack of a physical rack or logical grouping of devices (hosts and/or switches) from multiple racks), with each local TOR switch connecting twelve host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments. As with the core and aggregation layers switches, the TOR switches can also serve as failure points and there can be fault boundaries defined between the various TOR switches.

Also as illustrated in FIG. 2, there can be various power supplies 214 used to power the various physical components. These may be uninterruptable power supplies, for example, that are able to provide emergency power when the input power source, such as a power main or substation, fails. A power supply can provide emergency power for a period of time proportional to the amount of energy stored by the power supply. Accordingly, separation between power supplies can act as fault boundaries. Similarly, the power supplies will generally be supplied to a power source such as a substation 216, for example. Each geographic region, data center, or other physical grouping of resources can utilize a different substation in at least some embodiments, providing for additional fault boundaries. In various embodiments, each rack 208 or host machine 212 can include a security device 213. As shown in FIG. 2, security device 213 can secure access to power supplies 214, substation 216, and other hardware components. As discussed, security device 213 may be implemented as an application-specific integrated circuit, programmable logic device, or other device that is configured to provide secure filtering of transaction requests as they are received from, e.g., users, other computing devices, applications, or other entities. Such transaction requests may be received and filtered over low level hardware protocols, such as I2C, SMBus, PMBus, SPI, etc. Each security device may be configured to identify access patterns associated with different transactions and modify the data read or to be written prior to the transaction committing.

Figure 3:
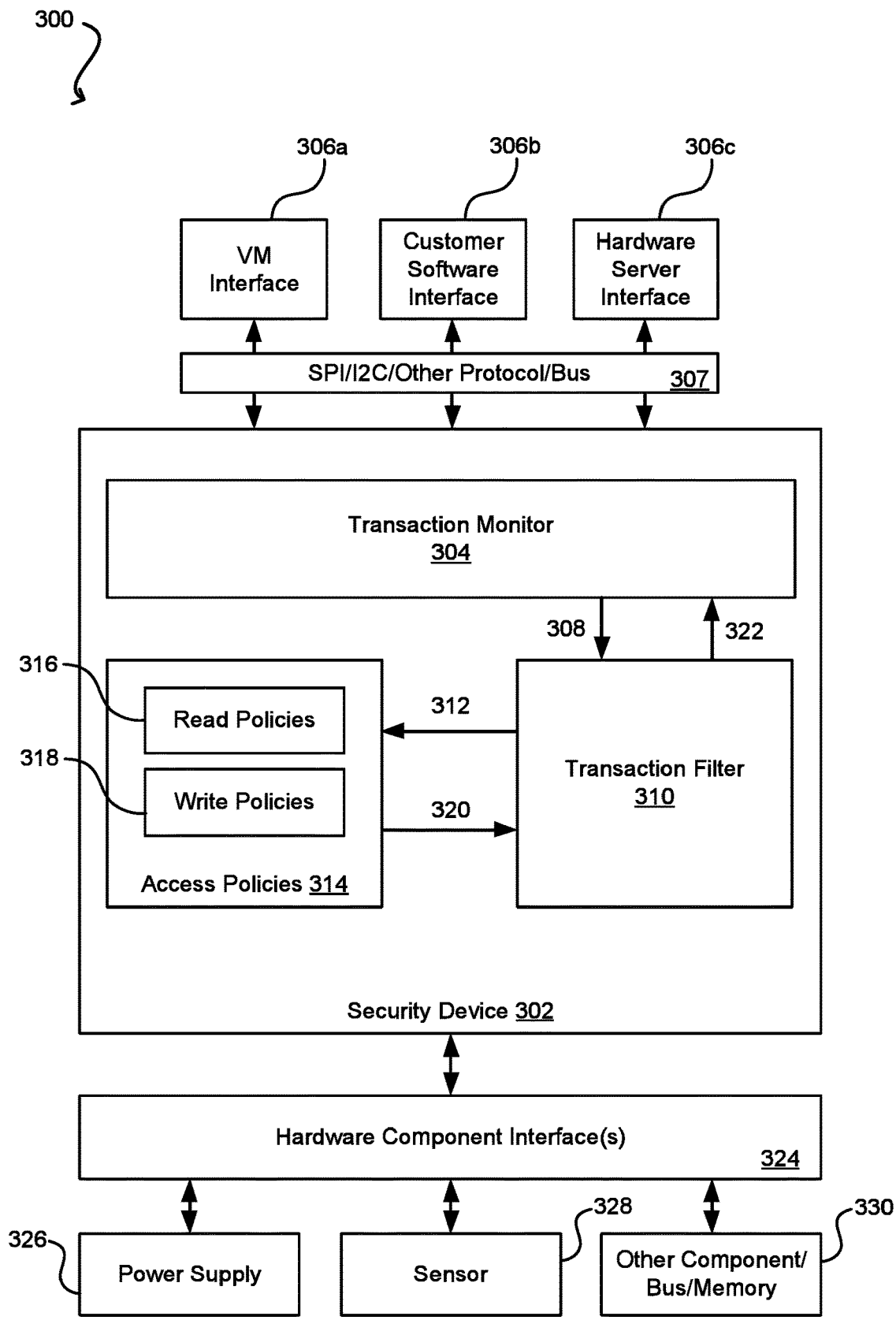
FIG. 3 illustrates an example of a security device, in accordance with various embodiments.

FIG. 3 illustrates an example 300 of a security device, in accordance with various embodiments. As shown in FIG. 3, a security device 302 may securely filter data received over various interfaces. For example, a transaction monitor 304 can monitor data received from various requestors over different interfaces 306a-306c. For example, as shown in FIG. 1B, requests may be received from virtual machines through VM interface 306a. In some embodiments, requests may be received from customer software applications through customer application interface 306b. Requests may also be received from a hardware or "bare-metal" server through hardware server interface 306c. As shown, requests received through various interfaces 306a-306c may be received over I2C, SMBUS, PMBUS, SPI, or other protocol or bus 307. A computing device, such as a server, may include a number of different interfaces used to connect to various devices. For example, a motherboard may include I2C interfaces to connect to EEPROMs, sensors, etc. Although reading from these devices may be allowed, writing to these devices is generally restricted. Customers may generally be restricted from writing over I2C, however, because many reads on the I2C bus are preceded by writes to set the read address, all write operations cannot merely be blocked. As such, embodiments are configured to determine which operations are allowed and which operations are not allowed, and prevent or allow execution accordingly.

Security device 302 may be a programmable logic device that can deployed in an application-specific integrated circuit (ASIC), complex programmable logic device (CPLD), field programmable gate array (FPGA) or other device which can be configured to filter transactions on a bus. The security device 302 can analyze each transaction, including the operation being requested, the memory address or the register being accessed, and/or the data in each transaction and determine whether to allow or modify the transaction. This protects hardware from potential damage or data loss/exposure as a result of a malicious actor on the server. As discussed above with respect to FIG. 1, a security device may be deployed to a hardware platform on a server.

Transaction monitor 304 can determine various transaction details for each transaction being performed over a bus. As an example, for an I2C transaction, the transaction details may include the type of transaction being performed (such as a write or a read), along with the registers or memory addresses associated with the transaction Similar transaction details may also be determined for SMBUS and PMBUS transactions, and may also include end device details, such as a device address or other devices connected to the same bus. The transaction monitor 304 may pass 308 these details to a transaction filter 310. Transaction filter 310 may then use 312 access policies 314 to determine whether the transaction is allowed. This may be performed in real-time, as data is in transit. In some embodiments, access policies 314 may include read policies 316 and write policies 318, defined for read and write operations respectively. The policies may be stored as truth tables or other data structures. These policies may define addresses, devices, or buses over which transactions may or may not be performed. An access policy may define one or more actions to be performed for a type of a request for an address or range of addresses. Depending on the action, the access policy may include additional data. For example, a masking access policy, which may cause data read from a particular address or addresses to be replaced with different data, may include an address that includes the data to be provided instead of the requested data. In some embodiments, the masking access policy may define that the data read from memory be replaced with all 0s or 1s, or with random values. Accordingly, rather than merely blocking to specific addresses, various actions may be performed on the transaction prior to completion of the transaction. For example, data may be intercepted and modified prior to returning data to the requestor. Additionally, or alternatively, the requested address may be modified to a different address on a read request. Additionally, or alternatively, a transaction may be blocked while a message indicating that the transaction has been completed may be returned.

In various embodiments, access policies 314 may be used to modify the transaction and/or transaction data prior to completing the transaction. For example, if a transaction is not allowed based on the access policies 314, a message can be returned 320 to transaction filter 310 indicating that the transaction is blocked (e.g., a "write block" value may be set to "1"). Transaction filter 310 can then modify the transaction data to return 322 a non-acknowledgement (NACK) to the corresponding requestor. When the NACK is received, the transaction may be canceled. Similarly, some protocols, such as SPI, may similarly analyze transaction details. However, rather than returning a NACK to the requestor, the transaction filter 310 may cause a chip select line to be set to an invalid value, causing the transaction to be canceled. In some embodiments, a read policy may be defined to modify the data that is returned to the requestor. For example, rather than returning data read from particular memory addresses, the data may be replaced with different data or masked data. For example, the data may be replaced with all 0s or all 1s. Alternatively, the data may be replaced with specific values, such as replacing a Ser. No. or identifier with a masked Ser. No. or identifier. In some embodiments, the access policies 314 may be configured to allow the access to proceed without modification. As shown in FIG. 2, the modified transactions may be modified and sent through an appropriate hardware component interface 324 to the requested component or device, such as power supply 326, sensor 328, or other component or bus 330. In some embodiments, blocked transactions may be prevented from the hardware component interface 324 by the security device 302. Although the transactions may be blocked, the security device 302 may return a message indicating that the transaction has been completed. As discussed, such filtering may be performed by the security device over low level hardware protocols.

In various embodiments, policies may be updated by making changes to the truth table (e.g., adding, removing, or changing patterns stored in the truth table or other policy data structure). Such changes may be made by the service provider or by a customer and approved or denied by the service provider. In some embodiments, address policies may be hardwired in the security device and may not be updated while the system is running. The system may be taken offline and the security device reprogrammed to update the policies. Although the policy data 314 is shown as included in security device 302, in alternative embodiments, the policy data 314 can be centrally in a data center or a service provider environment, or any other location accessible to the security device 302.

Figure 4:
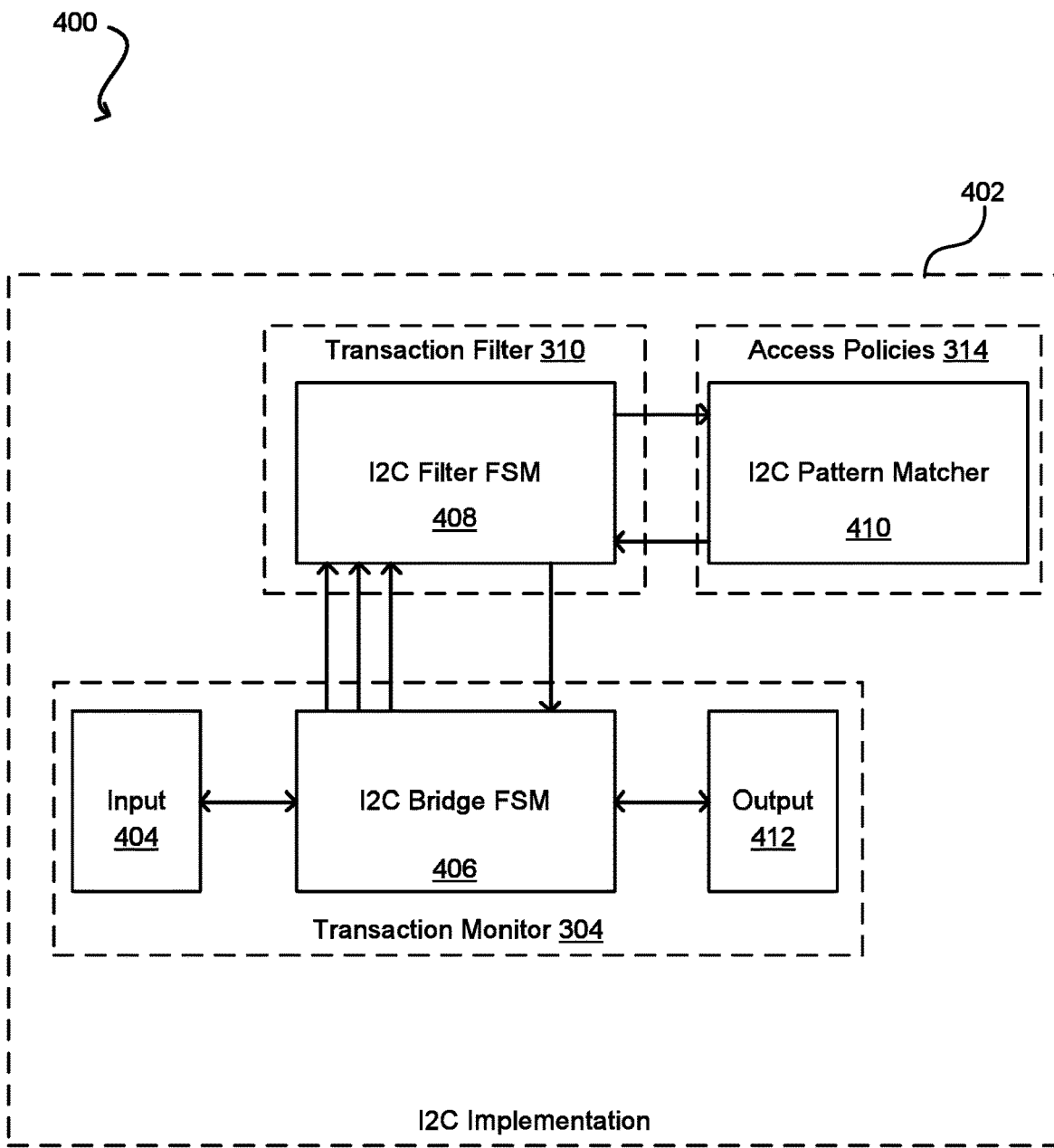
FIG. 4 illustrates a first example state machine implementation of providing secure hardware signal filtering using a security device, in accordance with various embodiments.

FIG. 4 illustrates a first example 400 state machine implementation of providing secure hardware signal filtering using a security device, in accordance with various embodiments. As shown in FIG. 4, secure hardware filtering may be implemented for I2C in a security device using a series of state machines 402. Transactions, including read and write operations, to an I2C memory can start with an I2C write cycle to set the target address. To write a byte or a page of data, an I2C master can send a stream of bytes after the target address. This may be terminated with an I2C stop condition. The memory begins an internally self-timed erase/write operation. To perform a read, the I2C master can use an I2C write to set the address, issue a stop condition, and then issue a read to get one or more bytes. In various embodiments, to block I2C writes, the Bridge FSM can limit write operations to the address only and, after the address (or after a portion of the address), the FSM can issue an I2C stop condition. Filter FSM can cause a NACK response to be returned to the requestor.

For example, a packet for an I2C transaction can be received at input 404 and passed to I2C bridge finite state machine (FSM) 406. Bridge FSM may act as the transaction monitor 304 of this implementation. Bridge FSM 406 may determine transaction data from the input packet and pass the transaction data to Filter FSM 408. The Filter FSM 408 can be an implementation of transaction filter 310 and perform filtering of the transactions based on the access policies. Filter FSM 408 can pass the transaction details to Pattern Matcher 410. Pattern Matcher 410 may define one or more read/write sequences that represent known commands (such as SMBUS commands). These specific sequences or patterns can be identified by filter FSM 408 using the pattern data of pattern matcher 410. Based on the match, the pattern matcher 410 can return policy details, which might be a write block parameter whose value indicates whether the transaction may be performed. For example, if write block=1, bridge FSM 406 may block the write. no packet data is passed to output 412 and a NACK is returned to the requestor, ending the transaction.

In some embodiments, multiple filter FSMs may be used, each matching different patterns. For example, a blocking filter FSM may be configured to match a write address for an EEPROM (which may include a 7-bit address and write flag) and two subsequent bytes. Upon matching the pattern, the write can be blocked, forcing a stop condition to the output 412 and returning a NACK to the requestor. As discussed, other patterns may be used to match known commands, including SMBUS or PMBUS commands. In some embodiments, a masking filter FSM may be configured to match a read address for an EEPROM, bus, or other address. If that read address is matched, the data being read may be replaced by data specified by the access policy. For example, the access policy may include a pointer to a different memory address including data to be provided in place of the requested data. In some embodiments, the masking filter FSM may be configured to replace all or a portion of the requested data with 0s or 1s. The portion of the requested data to be masked may be specified by the access policy.

Figure 5:
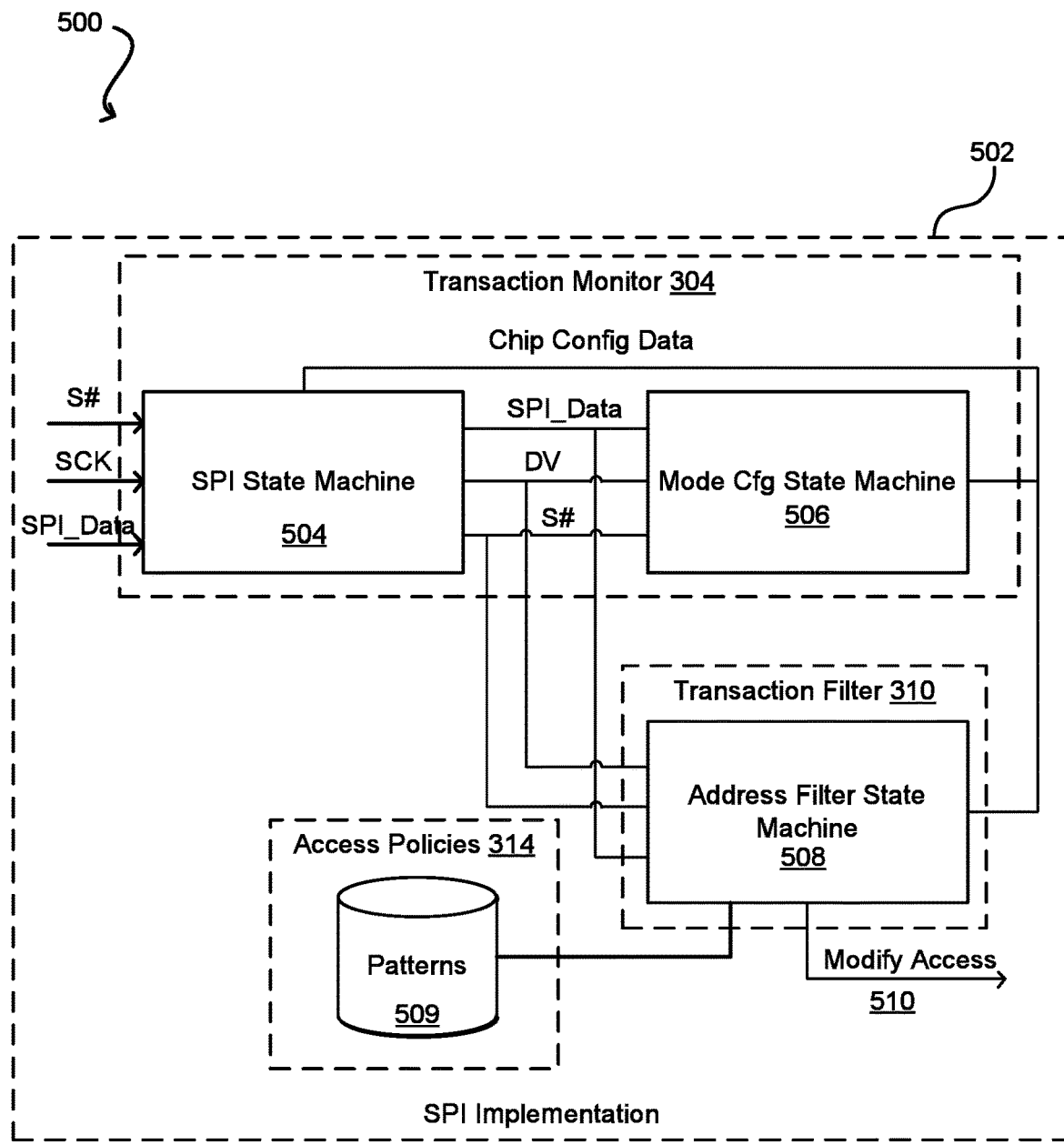
FIG. 5 illustrates a second example state machine implementation of providing secure hardware signal filtering using a security device, in accordance with various embodiments.

FIG. 5 illustrates a second example 500 state machine implementation of providing secure hardware signal filtering using a security device, in accordance with various embodiments. As in the I2C implementation example discussed above with respect to FIG. 4, an SPI implementation may also include a series of state machines 502. In various embodiments, the SPI state machine 504 may monitor the SPI clock (SCK), chip select (S#), and SPI transaction data (SPI_Data). When filtering, SPI State Machine 504 monitors events on the SPI bus to determine when the host processor is sending write commands to an SPI memory chip or other location. SPI State Machine (SM) 504 can monitor the transactions on the SPI bus, and accumulate data as it is received. Each time new data is received, the SPI SM can forward the new data to Mode CFG SM 506 and Address Filter SM 508.

In some embodiments, Mode Cfg SM 506 can monitor and decode SPI bus transactions to determine which mode the SPI chip is operating in (e.g., 3 or 4 byte addressing, XIP, DTR, 1/2/4 bit DQ, etc.). As the SPI operating mode is determined, the other state machines 508 and 504 can be alerted to the operating mode, for example, by storing the operating mode in local registers accessible to each state machine. In various embodiments, transaction monitor 304 may be implemented for SPI using the SPI State Machine 504 in combination with the Mode Cfg State Machine 506. As discussed the SPI State Machine 504 can collect transaction data as it is received, this transaction data causing the SPI State Machine to track the state of the SPI chip. As the data accumulates, the Mode Cfg State Machine can determine the operating mode. The transaction data and operating mode can be used to determine the transaction being performed.

The address filter state machine 508 can match sequences of transaction data from the SPI SM 504 that match patterns 509 stored in ROM, hardwired logic, or other memory or data store. Each pattern may be associated with a different access policy, and a match may cause the transaction to be modified according to the access policy. For example, where a blocking access policy is matched, the address filter state machine 508 may go into a blocked state. The address filter state machine may remain in the blocked state until the transaction fails (e.g., until the upstream S# deasserts). When the state machine is in the blocked state, it the downstream facing S# is set to inactive. In some embodiments, multiple address filter state machines may be implemented and the outputs combined to provide multiple address windows. For example the outputs may be OR'd, such that if any address is matched, the state machine is put into the blocked state. The state machine may enter the blocked state before the SPI master finishes sending its command to the target device. To ensure the state machine enters the blocked state in time, only a portion of the address may be matched. For example, on a 32-bit address, matching may be performed on the upper 12 (or 16 or 20) bits. This allows for time to set the S# off on the downstream port 510 prior to the command being completely sent. By setting the S# its inactive state for the duration of the bus cycle, write or erase operations are prevented from occurring to the given address.

As an example, the SPI SM 504 may accumulate transaction data and pass the transaction data to address filter SM 508. The address filter SM may be configured to match for a WRITE ENABLE command, followed by a WRITE, ERASE, PROGRAM or other write-type commands. These commands may include a 1-byte command code and 3 or 4 bytes of address information. In normal operation, to perform one of these commands, a controller asserts the chip select (S#), and then provides the command and address. When the controller deasserts the chip select, the operation commences. In the filtering case, the state machines monitor the transaction data which includes the WRITE ENABLE plus the command code, plus the upper 16 bits of the address. Depending on the operating mode of the SPI chip (as determined by the Mode Cfg SM 506) the address size for matching may be less than 22 (e.g., for a 3-byte addr) or 30 (e.g., for a 4-byte addr) to terminate the cycle before the SPI chip receives the full address. If the address filter SM 508 determines a match for an allowed region of memory, the command is allowed to complete. If it detects a match for a disallowed region of memory, the logic sets the downstream facing S# 510 high. The effect of this sequence is that the SPI chip discards the write cycle and clears the internal WRITE_ENABLE latch. The memory controller receives an indication of a failed command (e.g., write, erase, etc.) and the transaction is terminated.

As discussed, filtering may be performed on read requests as well. The SPI State Machine 504 may accumulate transaction data as described above. The transaction data may correspond to a read of a particular address or range of addresses. Once the read transaction has been identified, the address filter state machine 508 can match the read addresses to one or more patterns 509. Read access policies may be configured to block or mask data being read. For example, rather than returning data read from particular memory addresses, the data may be replaced with different data or masked data, such as replaced with all 0s or 1s. In some embodiments, the data may be replaced with specific values, such as replacing a Ser. No or identifier with a masked Ser. No. or identifier. In some embodiments, address filter state machine 508 can then modify 510 the transaction data being returned by the SPI chip may be replaced by the masked data specified by the matched policy.

In some embodiments, the security device may include a register/counter that counts out time intervals of programmable size. Address filter SM 508 may access the register to determine a number of allowed write cycles to the SPI chip in a given interval. If the number of allowed writes exceeds a maximum allowed value, as defined in policy data, this may indicate that an attack is underway. Accordingly, the address filter SM 508 may block further writes until the start of the next interval.

Figure 6:
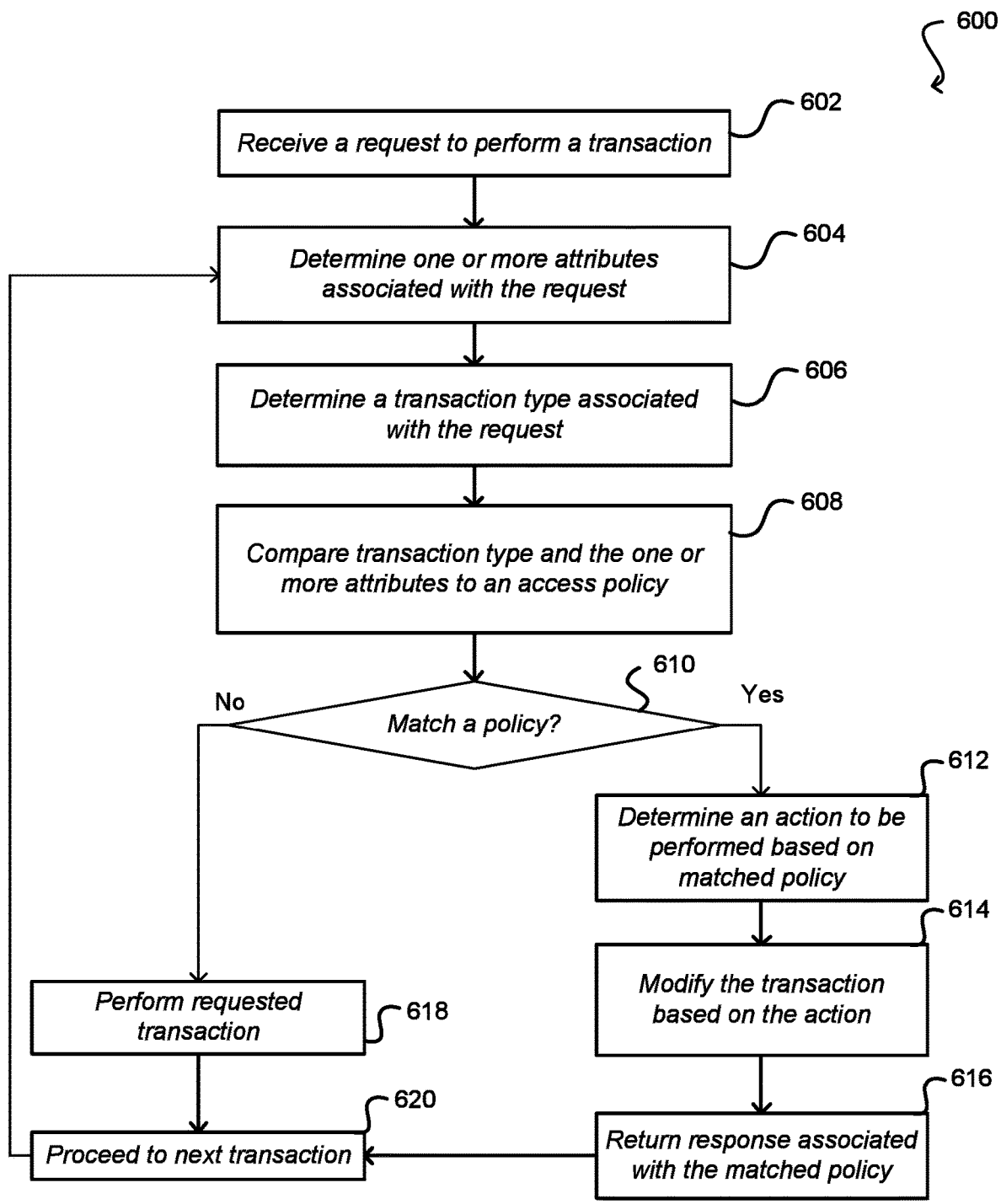
FIG. 6 illustrates an example process of providing secure hardware signal filtering using a security device for a first type of bus, in accordance with various embodiments.

FIG. 6 illustrates an example process 600 of providing secure hardware signal filtering using a security device for a first type of bus, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in FIG. 6, a request may be received 602 to perform a transaction. The request may be received at a server from a requestor computing device over a bus, such as an I2C or SPI bus. One or more attributes associated with the request may be determined 604. These attributes may include a memory location or device location where the transaction is to be performed. A transaction type (e.g., write, read, erase, etc.) associated with the may be determined 606. In some embodiments, a transaction may include a command represented by a sequence of read and write instructions. The transaction type and the one or more attributes can be compared 608 to an access policy. The access policy may define a memory or device address, or range of addresses, on which particular operations may be performed or may not be performed. For example, write access policies may include a range of memory addresses on which writes may not be performed and a range of memory addresses on which writes may be performed. Read access policies may similarly define such ranges where reads may and may not occur. If a policy is matched 610, an action to be performed on the transaction data may be determined 612 based on the matched policy. The transaction may then be modified 614 based on the matched policy. For example, a transaction may be blocked according to the matched policy. For a blocking matched policy, a stop condition may be issued to downstream components. In some embodiments, the matched policy may be a pass through policy and the transaction may be processed without further modification. In some embodiments, the matched policy may be a masking policy in which requested data is masked before it is returned to the requestor. In some embodiments, a read access policy may be configured to change the address being read in the transaction to be an address that includes masked data. A response can be returned 616 based on the matched policy. For example, for a blocking access policy a NACK may be returned to cancel the transaction. For a masking policy, the read data may be replaced or modified according to the masking access policy before it is returned to the requestor. In some embodiments, if the read transaction has been modified to read a different address which includes masked data, the data read from the different address may be returned to the requestor. If a policy is not matched, the requested transaction may be performed 618. Following the completion or canceling of the transaction, the next transaction may be processed 620, and processing may return to 604 for the next transaction.

Figure 7:
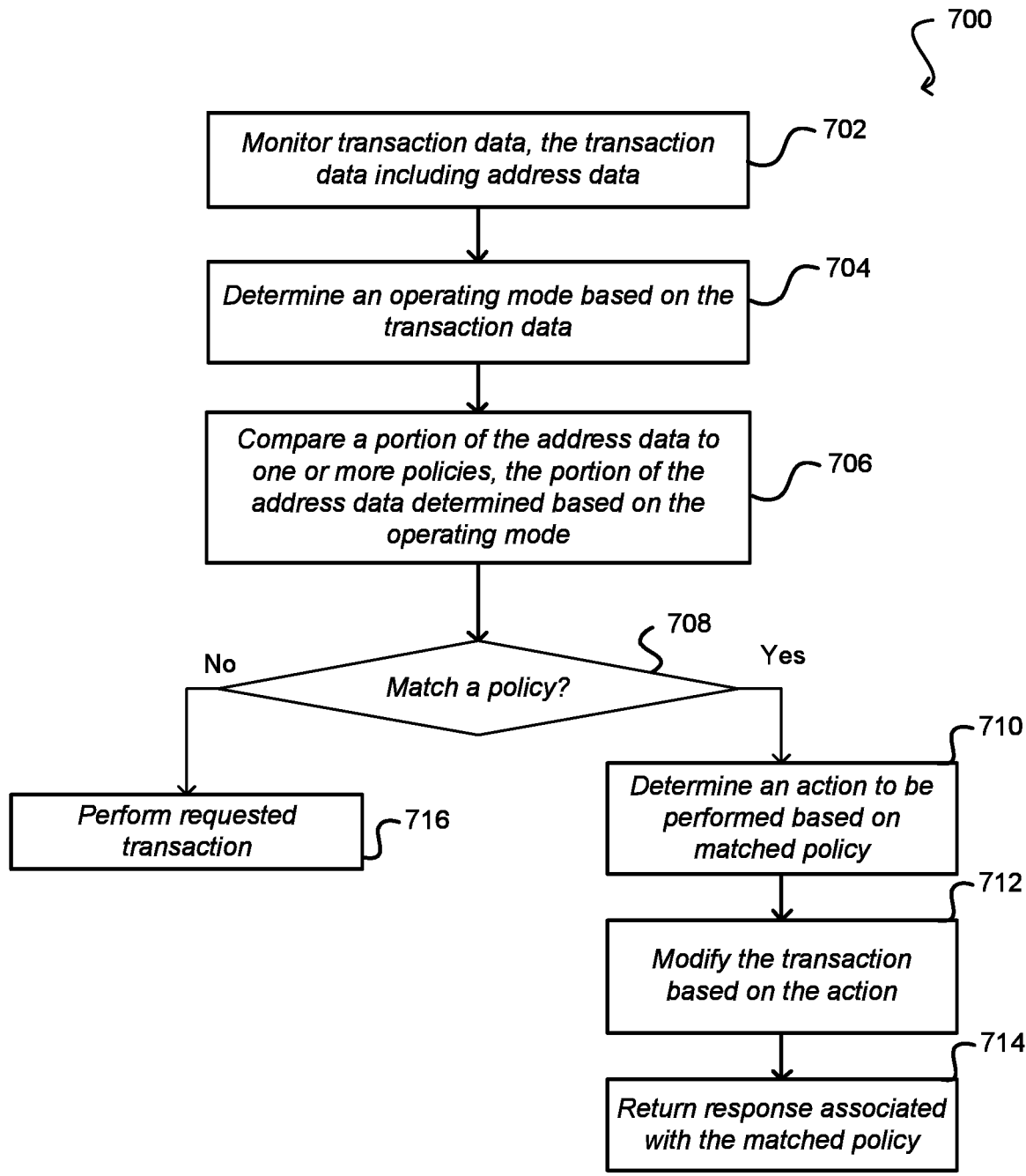
FIG. 7 illustrates an example process of providing secure hardware signal filtering using a security device for a second type of bus, in accordance with various embodiments.

FIG. 7 illustrates an example process 700 of providing secure hardware signal filtering using a security device for a second type of bus, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in FIG. 7, transaction data may be monitored 702. The transaction data may include address data, such as a memory or device location on which to perform the transaction. In some embodiments, transaction data can be monitored passively by tapping into the monitored bus. Based on the monitored transaction data, an operation mode can be determined 704. At least a portion of the address data can be compared 706 to one or more policies. The portion of the address data used may be determined based on the operating mode. For example, a larger portion of the address may be matched in 4 byte addr mode than in 3 byte addr mode. If the portion of the address matches a policy 708, an action to be performed on the transaction based on the matched policy can be determined 710. The transaction can be modified 712 based on the action specified by the matched policy. A response may then be returned 714 associated with the matched policy. For example, if a blocking access policy is matched, a block signal can be set to an invalid value and a transaction failed message can be returned. In some embodiments, if a masking policy is matched, the masking policy may define an action to be performed on the data read from the requested address. For example, the data may be masked or replaced with different data. In some embodiments, the read transaction may be modified to read from a different address than was requested. The data returned from the address specified in the masking policy may then be returned. If the portion of the address does not match the policy, the requested transaction can be performed 716.

Although embodiments have generally been discussed with respect to particular buses, embodiments may also be applied to higher speed buses like networking protocols such as Ethernet, high speed transactions like PCI Express, or SaaS or storage such as SATA, depending on hardware implementation. Embodiments may also be used in contexts other than server implementations. For example, automotive systems may maintain various vehicle and operation/management data in memory. As automotive systems become increasingly connected, including many vehicles maintaining wireless connections to provide service and usage monitoring, this data may similarly be exposed. Embodiments may be implemented in such automotive systems to filter access to these memory spaces.

Figure 8:
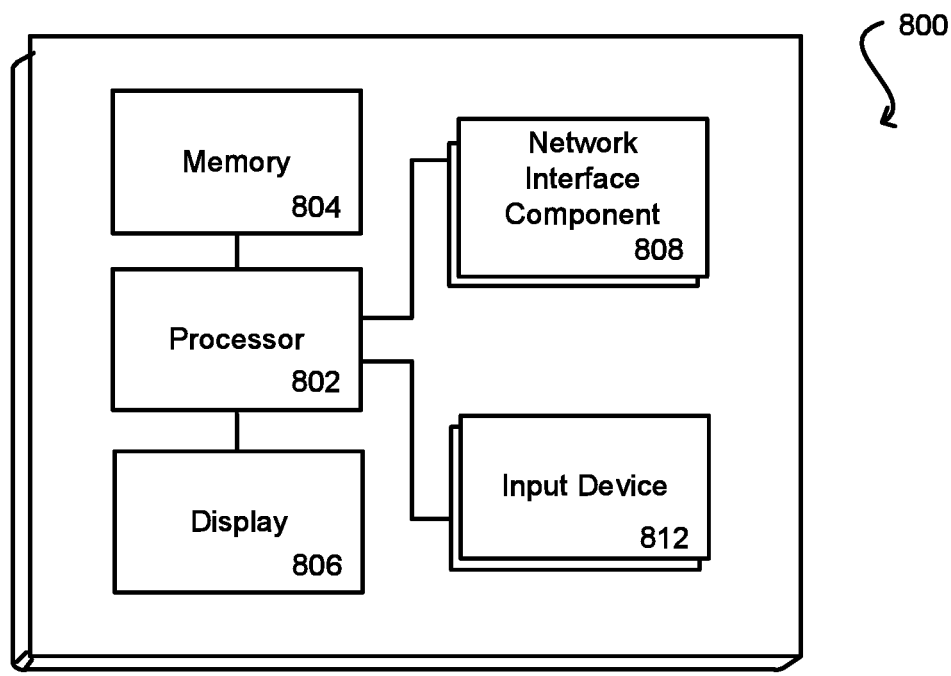
FIG. 8 illustrates a logical arrangement of a set of general components of an example computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device 812 (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   receiving a request to perform a transaction on a memory location over a hardware-level protocol, the request received by a server in a resource environment, the request including a transaction type and a memory location;
   determining, by a programmable logic device (PLD) at the server, the transaction type and the memory location from the request;
   comparing, by the PLD, the transaction type and the memory location to one or more access policies, the access policies defining an action to be performed on transactions for at least one of a memory address or a device address;
   matching, by the PLD, the memory location to the one or more access policies based at least in part on the memory location matching at least a portion of the memory address or the device address;
   determining that the action defined using the one or more access policies is a block action;
   in response to the determination that the action defined using the one or more access policies is a block action, returning a non-acknowledgement to a requestor computing device to cancel the transaction by setting a Serial Data (SDA) line high during an acknowledgement-related clock period of the hardware-level protocol; and
   issuing a stop condition to block the transaction from being performed on the memory location.

2. The computer-implemented method of claim 1, further comprising:
   receiving a second request to perform a second transaction on a second memory location;
   matching, by the PLD, the second memory location to the one or more access policies;
   determining a second action associated with the one or more access policies is a masking action;
   reading data from the second memory location; and
   masking the data from the second memory location based on the masking action.

3. The computer-implemented method of claim 1, further comprising:
   receiving a second request to perform a second transaction on a second memory location;
   matching, by the PLD, the second memory location to the one or more access policies;
   determining a second action associated with the one or more access policies is a masking action;
   reading data from a masked memory location specified by the one or more access policies; and
   returning data from the masked memory location.

4. A computer-implemented method comprising:
   receiving a request to perform a transaction at a server over a hardware-level protocol;
   determining, by a security device on the server, one or more attributes associated with the request;
   determining, by the security device, a transaction type associated with the request;
   comparing, by the security device, the transaction type and the one or more attributes to an access policy, the one or more attributes including a memory location or a device location, the access policy being associated with a memory address or a device address;
   matching, by the security device, the one or more attributes to the access policy based at least in part on the memory location matching at least a portion of the memory address or the device location matching at least a portion of the device address;
   determining an action to be performed on the transaction, the action defined using the access policy, is a blocking action; and
   in response to the determination that the action to be performed on the transaction is a blocking action, returning a non-acknowledgement (NACK) based on the action by setting a data line high during an acknowledgement-related clock period of the hardware-level protocol.

5. The computer-implemented method of claim 4, wherein determining an action to be performed on the transaction associated with the access policy, further comprises:

setting a block signal to an invalid value prior to receipt of a completed transaction command.

6. The computer-implemented method of claim 4, further comprising issuing a stop instruction.

7. The computer-implemented method of claim 4, further comprising:

reading data from at least one memory address specified in a second request; and masking at least a portion of the data read from the at least one memory address to create masked data.

8. The computer-implemented method of claim 7, further comprising:

replacing at least the portion of the data with replacement data specified by the access policy.

9. The computer-implemented method of claim 7, further comprising:

replacing at least one memory address specified in the second request with at least one masked memory address; and reading masked data from the at least one masked memory address.

10. The computer-implemented method of claim 4, wherein comparing, by the security device, the transaction type and the one or more attributes to an access policy further comprises:

comparing at least a portion of address data specified by the one or more attributes to the access policy.

11. The computer-implemented method of claim 4, wherein the one or more policies include at least one of a memory address, device address, or register address.

12. The computer-implemented method of claim 4, wherein the one or more policies include a command represented by a pattern of read and write transactions.

13. A computing device, comprising:

at least one processor;

a transaction monitor state machine configured to:

receive a request to perform a transaction at a server;

determine one or more attributes associated with the request, the one or more attributes including a memory location or a device location;

determine a transaction type associated with the request;

a transaction filter state machine configured to receive the transaction type and one or more attributes associated with the request from the transaction monitor state machine, the transaction filter state machine further configured to:

compare the transaction type and the one or more attributes to an access policy, the access policy being associated with a memory address or a device address;

determine that the memory location matches at least a portion of the memory address or the device location matches at least a portion of the device address;

determine an action to be performed on the transaction, the action defined by the access policy, is a blocking action; and in response to the determination that the action is a blocking action, return a non-acknowledgement based on the action by setting a data line high during an acknowledgement-related clock period.

14. The computing device of claim 13, wherein the transaction filter state machine is further configured to:

set the transaction filter state machine to a block state.

15. The computing device of claim 14, wherein the block state outputs a block signal having an invalid value prior to receipt of a completed transaction command.

16. The computing device of claim 14, wherein the transaction filter state machine is further configured to:

issue a stop instruction.

17. The computing device of claim 13, wherein the transaction filter state machine is further configured to:

read data from at least one memory address specified in a second request; and mask at least a portion of the data read from the at least one memory address to create masked data.

18. The computing device of claim 17, wherein masking at least a portion of the data read from the at least one memory address to create masked data further comprises:

replacing at least the portion of the data with replacement data specified by the access policy.

19. The computing device of claim 13, wherein the transaction filter state machine is further configured to:

replace at least one memory address specified in a second request with at least one masked memory address; and read masked data from the at least one masked memory address.

* * * * *